(12) United States Patent
Schondorf et al.

(10) Patent No.: US 9,384,515 B2
(45) Date of Patent: Jul. 5, 2016

(54) SHARED VEHICLE MANAGEMENT

(71) Applicant: Ford Global Technologies, LLC, Dearborn, MI (US)

(72) Inventors: Kristin Marie Schondorf, Dearborn, MI (US); Eric H. Wingfield, Ann Arbor, MI (US); Will Farrelly, Chelmsford (GB); Nikola Ristivojevich, West Bloomfield, MI (US); Kathleen Blackmore, Northville, MI (US); Marcus Mueller, Bergisch Gladbach (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/669,547

(22) Filed: Mar. 26, 2015

(65) Prior Publication Data

US 2015/0321672 A1    Nov. 12, 2015

Related U.S. Application Data

(60) Provisional application No. 61/989,755, filed on May 7, 2014, provisional application No. 61/989,739, filed on May 7, 2014, provisional application No. 61/989,751, filed on May 7, 2014, provisional application No. 61/989,752, filed on May 7, 2014, provisional application No. 61/989,756, filed on May 7, 2014.

(51) Int. Cl.
*G06Q 10/02* (2012.01)
*G06Q 50/10* (2012.01)
*B60W 30/182* (2012.01)

(52) U.S. Cl.
CPC ............. *G06Q 50/10* (2013.01); *B60W 30/182* (2013.01); *B60W 2550/12* (2013.01); *B60W 2550/20* (2013.01); *B60W 2600/00* (2013.01)

(58) Field of Classification Search
CPC combination set(s) only.
See application file for complete search history.

(56) References Cited

U.S. PATENT DOCUMENTS

| | | | |
|---|---|---|---|
| 6,483,198 B2 | 11/2002 | Schmitz et al. | |
| 6,882,290 B2 | 4/2005 | French et al. | |
| 7,627,422 B2 | 12/2009 | Adamczyk et al. | |
| 8,457,873 B2 | 6/2013 | Hyde et al. | |
| 8,498,953 B2 | 7/2013 | Lehmann et al. | |
| 8,688,299 B2 | 4/2014 | Saito et al. | |
| 2004/0049424 A1 | 3/2004 | Murray et al. | |
| 2004/0054561 A1 | 3/2004 | Ogura et al. | |
| 2006/0265235 A1 | 11/2006 | Schuchardt et al. | |

(Continued)

FOREIGN PATENT DOCUMENTS

| | | |
|---|---|---|
| CA | 2599615 | 4/2009 |
| CN | 102407850 | 4/2012 |

(Continued)

OTHER PUBLICATIONS

GB Search Report dated Nov. 6, 2015 (5 pages).

(Continued)

*Primary Examiner* — Yonel Beaulieu
(74) *Attorney, Agent, or Firm* — Frank A. MacKenzie; Bejin Bieneman PLC

(57) ABSTRACT

A location of a shared vehicle is identified. Shared vehicle usage data is obtained for the location. An instruction is provided to adjust an operating mode of the shared vehicle based at least on the shared vehicle usage data and the location.

20 Claims, 4 Drawing Sheets

(56) References Cited

U.S. PATENT DOCUMENTS

| | | |
|---|---|---|
| 2010/0280700 A1 | 11/2010 | Morgal et al. |
| 2011/0010300 A1 | 1/2011 | Audet |
| 2011/0144963 A1 | 6/2011 | Johnson |
| 2011/0307130 A1 | 12/2011 | Gow et al. |
| 2013/0054281 A1* | 2/2013 | Thakkar ............... G06Q 50/30 705/5 |
| 2013/0085817 A1 | 4/2013 | Pinkus |
| 2013/0173358 A1 | 7/2013 | Pinkus |
| 2013/0321178 A1 | 12/2013 | Jameel et al. |
| 2013/0325521 A1 | 12/2013 | Jameel et al. |
| 2014/0081764 A1 | 3/2014 | James |
| 2014/0149222 A1 | 5/2014 | Vanderwall et al. |
| 2015/0254581 A1* | 9/2015 | Brahme ............ G06F 17/30241 705/5 |
| 2015/0317568 A1* | 11/2015 | Grasso ............... G06Q 10/1093 705/5 |

FOREIGN PATENT DOCUMENTS

| | | |
|---|---|---|
| CN | 102729987 | 10/2012 |
| CN | 102842150 | 12/2012 |
| CN | 102991497 | 3/2013 |
| CN | 103440685 | 12/2013 |
| EP | 2228275 | 9/2010 |
| WO | WO 2011072564 | 6/2011 |
| WO | 2012046469 | 4/2012 |
| WO | WO 2013044319 | 4/2013 |
| WO | 2014030233 | 2/2014 |

OTHER PUBLICATIONS

As the "Pillar Next-generation ECO Car" evolving from Hybrids <HV>, © 1995-2014 Toyota Motor Corporation, 8 pages.

Carpool Incentive Programs: Implementing Commuter Benefits Under the Commuter Choice Leadership Initiative, EPA 420-S-01-004, Sep. 2001, 21 pages.

* cited by examiner

SHARED VEHICLE MANAGEMENT

RELATED APPLICATIONS

This application claims priority to Provisional Application Ser. No. 61/989,755 filed May 7, 2014 entitled "Shared Vehicle Systems and Methods"; Provisional Application Ser. No. 61/989,739 filed May 7, 2014 entitled "Shared Vehicle Systems and Methods", Provisional Application Ser. No. 61/989,751 filed May 7, 2014 entitled "Shared Vehicle Systems and Methods; Provisional Application Ser. No. 61/989,752 filed May 7, 2014 entitled "Shared Vehicle Systems and Methods"; and Provisional Application Ser. No. 61/989,756 filed May 7, 2014 entitled "Shared Vehicle Systems and Methods", each of which provisional applications are hereby incorporated herein by reference in their respective entireties.

BACKGROUND

Personal vehicles generally provide a flexible form of transportation for commuters and passengers within urban environments. However, owning and operating a personal vehicle can be expensive when costs for the vehicle, fuel, insurance, and maintenance are factored in. In addition, personal vehicles increase congestion and pollution in urban environments. Public transit systems, including buses, trains, subways, etc., that operate on a fixed schedule, provide alternate lower cost options for commuters. Shared transportation options reduce in-city congestion and improve air quality. However, a commuter may have limited flexibility in terms of departure and arrival times, as well as departure and arrival locations.

Another shared transportation option that provides a good mix of flexibility, cost, ease of use, and environmental impact is a shared vehicle system. Therein, a fleet of vehicles are distributed over an operating zone (e.g., a city) and a user can rent any vehicle of the fleet for a short period (e.g., a few hours of a day). Once a user account is set up, the user can identify a vehicle he or she wishes to rent based on its location within the operating zone, and rent the vehicle without requiring additional paperwork. The user can then return the vehicle to the point of origin or drop off the vehicle at an alternate location, per the user's convenience. The shared vehicle system reduces the user's commuting costs while also reducing in-city congestion and pollution. At the same time, the ability to pick-up and drop-off a vehicle at a time and location determined by the user increases the user's flexibility.

However, shared vehicle systems can present congestion and air quality problems. For example, if the shared vehicle is used in urban environments at times and locations where high traffic volumes one-way travel limitations, etc., are present, the shared vehicle may itself contribute to the congestion and pollution. In addition, intermittent relocation of shared vehicle may have to be performed to ensure that vehicles are evenly distributed through an operating zone and not clustered in only one area. In other words, the vehicle distribution may have to be rebalanced. The rebalancing may cause vehicles to be driven long distances, adding to emissions.

DESCRIPTION

Figure 1:
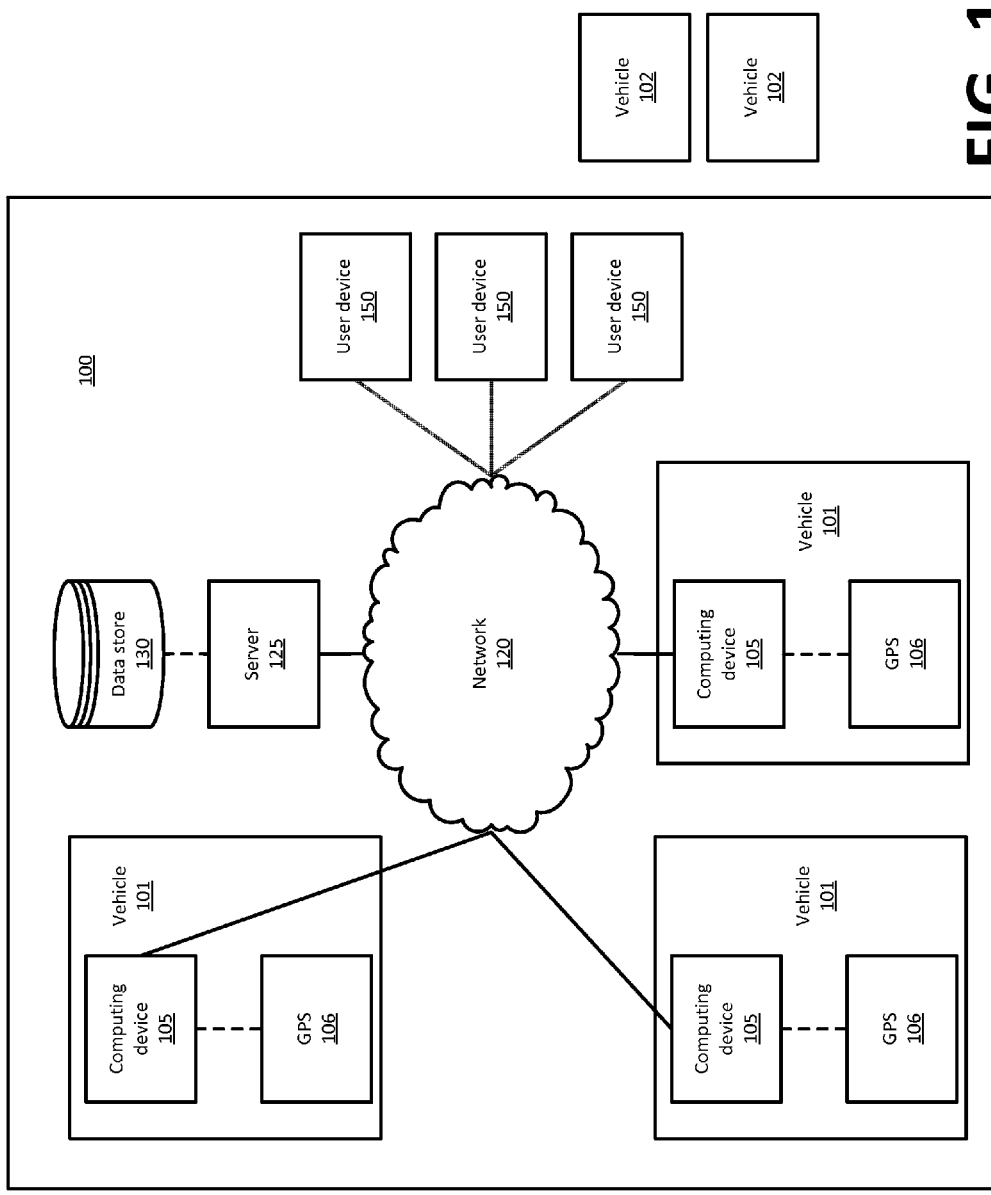
FIG. 1 is a block diagram of an exemplary shared vehicle system.

A vehicle operating mode, e.g., electric motor mode versus internal combustion engine mode, may be adjusted in a shared vehicle system based on emissions, congestion, and rebalancing requirements. Operation of shared vehicle can be controlled such that a commuter's vehicle usage is not affected, or is minimally affected, while allowing emissions and congestion to be reduced. In particular, a vehicle mode may be automatically adjusted, e.g., via a central server, central application, or administrator communicatively coupled, e.g., via a wide area network including mechanisms such as a cellular network, WiFi, a wide area network such as the Internet, etc., to each vehicle in the shared vehicle system's fleet.

Adjustments to a vehicle mode may be based on various factors including the congestion and emissions level in an operating zone of the vehicle. In addition, the mode may be adjusted based on an estimated or user-specified destination, e.g., based on a user's profile generally including a user's travel history, indicating where the vehicle rented by the user may be or is headed, how long the vehicle will likely be driven, and if further relocation of the vehicle will be required for rebalancing purposes after the vehicle is dropped off by the user. Thus, if the vehicle is being driven into an operating zone known to have high traffic density (e.g., into downtown), the vehicle may be automatically shifted to an electric mode in anticipation of more stop-and-go travel. In comparison, if the vehicle is being driven into an operating zone known to have low traffic density (e.g., into a suburb), the vehicle may be automatically shifted to an engine mode while in the low traffic density zone, irrespective of requests by the user of the vehicle operating mode. For example, a driver may make an initial request for the vehicle operating mode, but such mode may be overridden by a central management server/application based on the various factors described herein.

The operating mode may be further determined based on when and where the vehicle is or will be dropped off. A drop-off location may be predicted based on a user's travel history and/or based on user-specified data. For example, if it is known that a given user tends to use the vehicle within the city for 30 minutes and to return the vehicle in a downtown area, where demand for the shared vehicle is higher, it may be determined that the vehicle is likely to be rented soon after return by the user, leaving little time for vehicle charging. Consequently, even when operating in the high traffic density region, the vehicle may not be operated in the electric mode (or operated less in the electric mode than it otherwise would) due to the limited time available for subsequent vehicle charging. In an alternate example, it may be known that a given user tends to use the vehicle for 30 minutes and return the vehicle in the suburb, where demand for the shared vehicle is lower, but charging time is higher. Further, relocation of the vehicle may be required after a duration of vehicle return in the suburb so that enough vehicles are available in downtown to meet the demand. Consequently, when operating in the high traffic density region, the vehicle may be operated in the electric mode and shifted to the engine mode when operating in the low traffic density region. The vehicle may also be charged in the suburb before being relocated to the downtown for rebalancing, thus enabling improved rebalancing.

In another example, the vehicle drive mode (e.g., engine, hybrid, electric, etc.) may be selected based not only the current user's profile and reservation data, but also based on future reservations of that particular vehicle, and the future user's reservation requests and user profiles. Further, the selection of the drive mode may be based on various vehicle operating conditions in real-time, such as state of charge, etc., but the thresholds for making a change in the operating mode may be adjusted differently for different users based on the rental rates paid, user profiles, etc. As such, while the vehicle may transition from electric to hybrid, or hybrid to engine only, at a given threshold state of charge for a given set of conditions for a first user, it may transition at a different threshold for those same conditions for a second, different user. Such variances can better accommodate user requests for different performance from the same vehicle.

In still another example, the vehicle may automatically adjust the selection of the drive mode based on rebalancing information pushed to the vehicle control system from a central rebalancing system monitoring the fleet of vehicles and comparing it to a desired vehicle distribution across the operating region of the fleet. For example, even though a user may desired electric operation and while electric operation may be feasible given the state of charge, the vehicle controller may transition to hybrid operation based on instructions from the central system knowing that the vehicle is headed away from a desired balancing position and thus will need to be returned, and further because the vehicle is headed in a direction of low density of charging locations (meaning that rebalancing will require depletion of electric charge more than is available and it is desirable to reserve the electric operation for a portion of the return/rebalancing trip which will occur in a region of the city having higher requirements or incentives for electric operation).

Turning now to the drawings, FIG. 1 is a block diagram of an exemplary shared vehicle system 100 that includes at least one, and typically a plurality, of vehicles 101, e.g., a shared vehicle such as a motorcycle, car, van, etc. Each vehicle 101 includes a computer 105 communicatively coupled with a network 120. The vehicle 101 may further include a global positioning system (GPS) device 16 or the like in a vehicle 101. Vehicles 101 may share roadways with vehicles 102 that are not part of the shared vehicle system 100, i.e., that are not available for sharing via a server 125.

A vehicle 101 computer 105 may be configured for communications on a controller area network (CAN) bus or the like, and/or other wire or wireless protocols, e.g., Bluetooth, etc., i.e., the computer can communicate via various mechanisms that may be provided in a vehicle 101, and can accordingly receive data from vehicle sensors, communications via the network 120, e.g., from the server 125, etc. The computer 105 may also have a connection to an onboard diagnostics connector (OBD-II). Via the CAN bus, OBD-II, and/or other wired or wireless mechanisms. Further, a navigation system 106 may be provided in the vehicle 101 and communicatively coupled to the computer 105 to provide location data, e.g., via a global positioning system (GPS) or the like. The computer 105 may provide data, including location information of the vehicle 101, to the server 125 via a network 120.

The network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.101, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to the data store 130 for storing data received from one or more vehicles 101.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.101, Bluetooth, and/or cellular communications protocols. Further, the user device 150 may use such communication capabilities to communicate via the network 125 including with a vehicle computer 105. A user device 150 could communicate with a vehicle 101 computer 105 the other mechanisms, such as a network in the vehicle 101, a known protocols such as Bluetooth, etc. Further, a user device 150 could be used to provide a human machine interface (HMI) to the computer 105.

Figure 2:
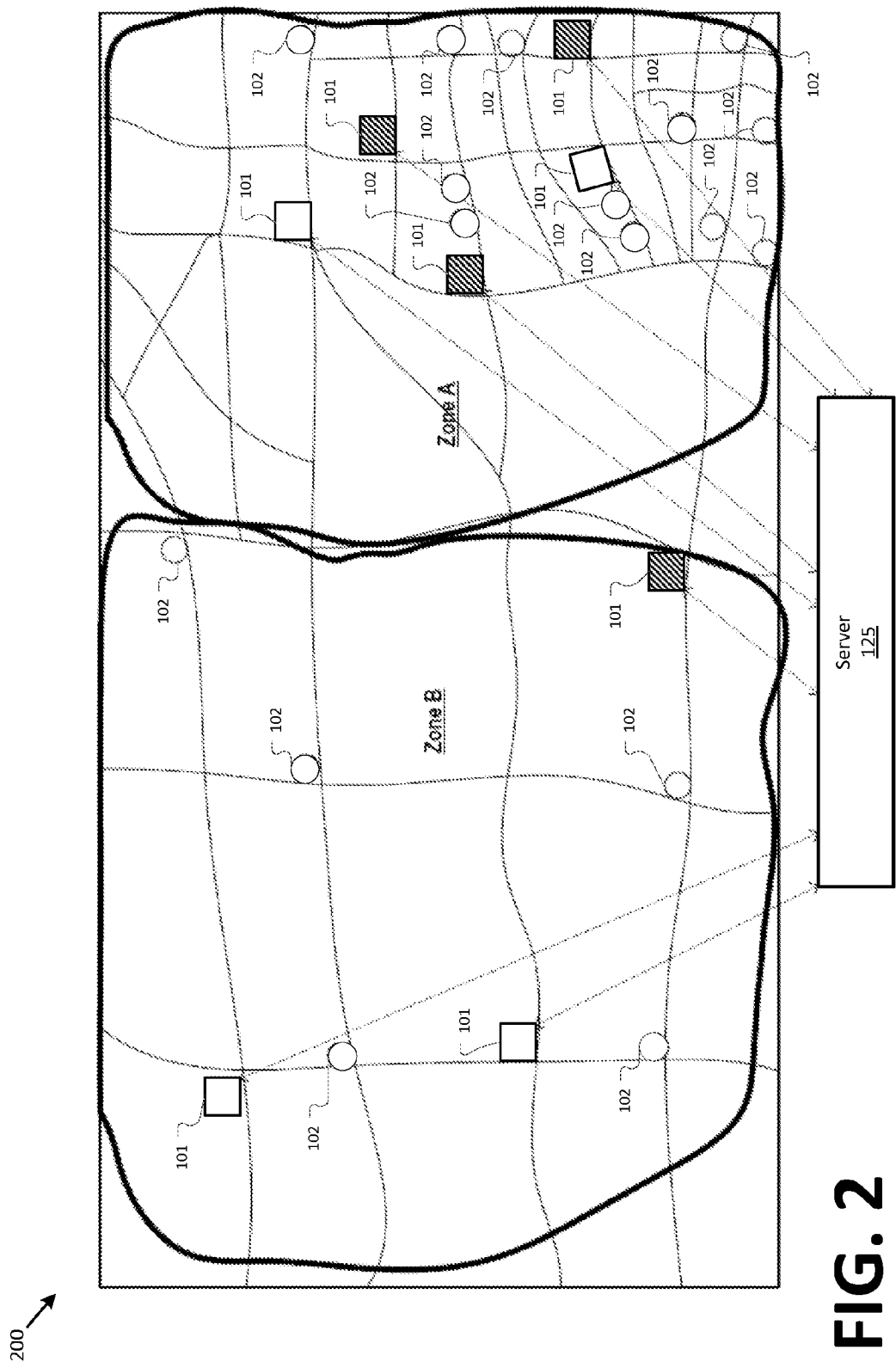
FIG. 2 is a high level representation of an implementation of the system of FIG. 1.

FIG. 2 is a high level representation of an implementation of the system of FIG. 1 within a geographic area 200. As can be seen, the area 200 may be divided into multiple zones, e.g., Zone A and Zone B, as seen in FIG. 2. Vehicles 101 within each of the zones, i.e., in the geographic area 200, may communicate with the server 125, e.g., via the network 120 (as seen in FIG. 1). Further, vehicles 102 that are not part of the system 100, as mentioned above, may be included in the geographic area 200. Vehicles 101 in the geographic area 200 may be available for use by a participant in the shared vehicle system 100, or in use. For example, vehicles 101 in FIG. 2 represented by on shaded squares may be considered to be available for use, whereas vehicles 101 represented by shaded squares may be considered to be in use. As mentioned further below, the server 125 may make determinations to relocate vehicles 101 not in use from a first location to a second location, e.g., the server 125 could decide to relocate a vehicle 101 from the Zone A to the Zone B because a number of vehicles 101 in the Zone A is higher. Moreover, a vehicle 101 could travel from the Zone B to the Zone A, warranting rebalancing once a user is done with that vehicle 101. As part of such a vehicle 100 movement and/or rebalancing, engine modes may be changed as described further below.

Figure 3:
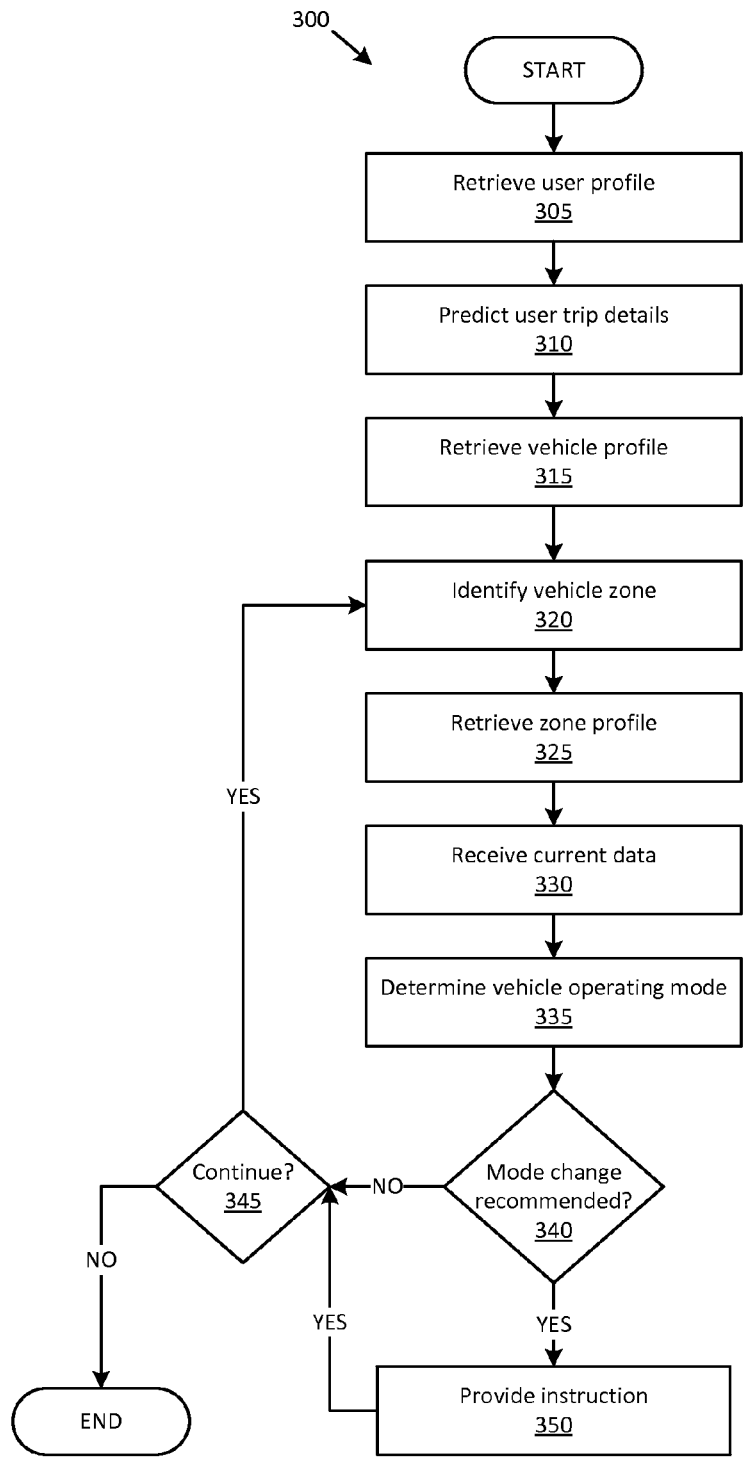
FIG. 3 is a process flow diagram illustrating an exemplary process for selecting an engine mode for a shared vehicle.

FIG. 3 is a process flow diagram illustrating an exemplary process 300 for selecting an engine mode for a shared vehicle. The process 300 is described as being performed by the server 125, in communication with a computer 105 in a vehicle 101, but alternatively or additionally, some or all of the process 300 could be carried out in a vehicle 101 computer 105.

In any event, the process 300 begins in a block 305, in which the server 125 retrieves a user profile, e.g., from a data store 130, of a user of a vehicle 101 being operated or about to be operated. The user profile may include drop-off and/or pick-up locations previously used by and/or preferred by a user, as mentioned above. A user profile may also include historical details such as average trip length, driving speeds, etc.

Next, in a block 310, using data included in the user profile, the server 125 predicts user trip details. For example, the server 125 may predict a distance of travel, an operating zone or zones within a geographic area covered by the server 125 (e.g., the area 200 shown in FIG. 2), a likely drop-off location or locations, etc.

Next, in a block 315, the server 125 retrieves a vehicle 101 profile, e.g., data about and/or operating history of a vehicle 101 selected by a user for the trip. For example, vehicle 101 data may include a status of a vehicle 101 battery, e.g., fall, half-charged, almost empty, etc., as well as data about a level of combustible fuel for an internal combustion engine, battery and/or combustible fuel consumption rates, etc.

Next, in a block 320, the server 125 identifies a zone of vehicle 101 operation in an area 200 covered by the server 125. For example, a zone may be a geographic area bounded by streets, governmental boundaries, natural features such as rivers, etc., or a zone could be defined according to a square or other shape having a point in an area 200 as its center or locus.

Next, in a block 325, the server 125 retrieves profile data for the identified zone. For example, historical data for a zone could indicate a typical air-quality given a time of day, day of year, etc., as well as likely traffic congestion for a time of day and/or day of year or week, etc.

Next, in a block 330, the server 125 retrieves a current, e.g., real-time, data concerning traffic congestion, air-quality, and/or other factors, for the identified zone.

Next, in a block 335, the server 125 determines a current operating mode of the vehicle 101, e.g., electric vehicle (EV) mode or internal combustion (IC) mode. For example, the vehicle 101 computer 105 may provide such data to the server 125, e.g., indicating a mode of operation with an electric motor or an internal combustion engine, via the network 120.

Next, in a block 340, the server 125 determines whether a mode change is recommended. For example, as described above, factors such as fuel levels supporting various modes in the vehicle 101, current air-quality, expected travel distance, and/or possibly other factors, may be taken into account to determine whether an EV mode or an IC mode is appropriate for a zone, characteristics of the zone, and characteristics (and/or expected characteristics) of a user's trip, as discussed above. An exemplary sub process 400 for determining an appropriate mode is discussed in more detail below with respect to FIG. 4. If a mode change is recommended, then a block 350 is executed next. Otherwise, a block 345 is executed next.

In the block 345, the server 125 determines whether the process 300 should continue. For example, if the vehicle 101 has reached its destination, is powered off, etc., then the process 300 ends. Otherwise, the process 300 returns to the block 320.

In the block 350, the server 125 provides the engine mode recommendation to the vehicle 101 computer 105. For example, the server 125 could provide an instruction to the vehicle 101 to change an engine mode, e.g., from EV to IC, or vice versa. Following the block 350, the process 300 proceeds to the block 345.

Figure 4:
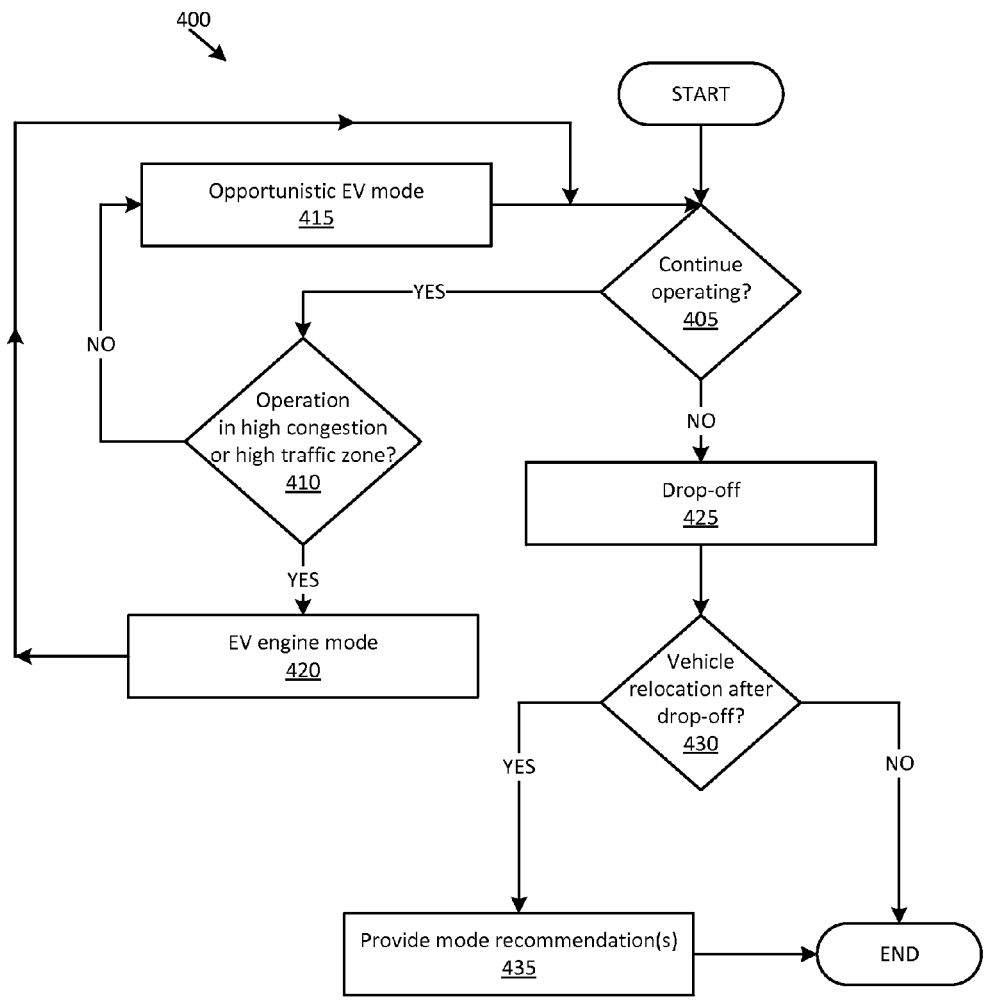
FIG. 4 is a process flow diagram for operating a shared vehicle including engine mode recommendations.

FIG. 4 is a process flow diagram for a process 400 operating a shared vehicle 101 including engine mode recommendations. The process 400 begins in a block 405, in which, similar to the block 345 discussed above concerning the process 300, the server 125 determines whether the vehicle 101's continuing operations. For example, if the vehicle 101 is at or near a destination or drop-off point, is powered off, etc., then a block 425 may be executed next. Otherwise, the process 400 proceeds to a block 410.

In the block 410, the server 125 determines whether the vehicle 101 is operating in a high congestion and/or high-traffic zone. For example, the server 125 may receive data from sources such as are known indicating a traffic density, e.g., number of cars or other vehicles per unit, e.g., 100 meters, 500 meters, etc. of a roadway or roadways in a zone. A zone may be considered a high congestion or high-traffic zone if the traffic density exceeds a predetermined threshold. Alternatively or additionally, a zone may be determined to be a high congestion or high-traffic zone if an average speed of vehicles 101, 102 in the zone is below a predetermined threshold, e.g., below an average speed limit in the zone, etc. Yet further, air-quality and/or environmental conditions may be taken into account to determine whether a zone is a high congestion zone. For example, air-quality below a predetermined threshold, e.g., a measurement of pollution below a predetermined threshold, may be an indicator that a zone is a high congestion zone. If the vehicle 101 is operating in a high congestion or high traffic zone, then a block 420 may be executed next. If the vehicle 101 is not operating in a high congestion or high-traffic zone, then a block 415 may be executed next. In the block 415, the server 125 instructs the vehicle 101 to operate in an opportunistic EV mode. That is, depending on a level of battery charge, a trip distance, etc., the vehicle 101 may operate in EV mode so long as sufficient battery resources are expected for the trip and/or for high congestion or high-traffic zones that may be encountered later in the trip. Otherwise, the vehicle 101 may operate in an IC mode. In any case, following the block 415, the process 400 returns to the block 405.

In the block 420, which may follow the block 410, the server 125 instructs the vehicle 101 to operate in an EV mode. The process 400 then returns to the block 405.

In the block 425, which may follow the block 405, a vehicle 101 is dropped off by a user at a drop-off point. Such drop-off may be registered by the server 125, e.g., according to a message via the network 120 from the vehicle 101 computer 105.

Following the block 425, in a block 430, the server 125 determines whether the vehicle 101 needs to be relocated, e.g., from a first zone to a second zone, following its drop-off. For example, as mentioned above with respect to FIG. 2, a number of vehicles in a first zone may exceed, or exceed by a predetermined threshold, e.g., more than 10 percent, 20 percent, etc., a number of vehicles in a second zone. In that case, the server 125 may determine that the vehicle 101 just dropped off needs to be relocated. If a determination is made that a vehicle needs to be relocated, then a block 435 is executed next. Otherwise, the process 400 ends following the block 430.

In the block 435, the server 125 provides a mode recommendation for travel of the vehicle 101 from the drop off point to a relocation point in a second zone. For example, such recommendation may be provided as described above. Following the block 435, the process 400 ends.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions such that the computer is programmed to:
   identify a location of a shared vehicle;
   obtain shared vehicle usage data for the location; and
   provide an instruction to adjust an operating mode of the shared vehicle based at least on the shared vehicle usage data and the location.

2. The system of claim 1, wherein the usage data includes at least one of a user history, historical traffic data, and historical air quality data.

3. The system of claim 1, wherein the operating mode adjustment is to one of an electric vehicle mode, an internal combustion mode, and an opportunistic electric vehicle mode that includes operations in each of the internal combustion mode and the electric vehicle mode.

4. The system of claim 1, wherein the computer is further programmed to receive the location of the vehicle from a computer in the vehicle via a network.

5. The system of claim 1, wherein the computer is further programmed to use the location to determine a zone in which the shared vehicle is operating.

6. The system of claim 5, wherein the computer is further programmed to provide the instruction to adjust the operating mode according to whether the zone in which the shared vehicle is operating is associated with at least one of air quality below a predetermined threshold and traffic congestion above a predetermined threshold.

7. The system of claim 5, wherein the computer is further programmed to provide the instruction to adjust the operating mode according to a speed of travel of vehicles in the zone.

8. The system of claim 1, wherein the computer is further programmed to determine that the shared vehicle has reached a drop-off point, and to determine whether the shared vehicle is to be re-located after reaching the drop-off point.

9. The system of claim 8, wherein the computer is further programmed to recommend an operating mode for the vehicle for a relocation of the vehicle.

10. The system of claim 1, further comprising a second computer, the second computer being included in the shared vehicle and programmed to receive the instruction and adjust the operating mode according to the instruction.

11. A method, comprising:
    identifying a location of a shared vehicle;
    obtaining shared vehicle usage data for the location; and
    providing an instruction to adjust an operating mode of the shared vehicle based at least on the shared vehicle usage data and the location.

12. The method of claim 11, wherein the usage data includes at least one of a user history, historical traffic data, and historical air quality data.

13. The method of claim 11, wherein the operating mode adjustment is to one of an electric vehicle mode, an internal combustion mode, and an opportunistic electric vehicle mode that includes operations in each of the internal combustion mode and the electric vehicle mode.

14. The method of claim 11, further comprising receiving the location of the vehicle from a computer in the vehicle via a network.

15. The method of claim 11, further comprising using the location to determine a zone in which the shared vehicle is operating.

16. The method of claim 15, further comprising providing the instruction to adjust the operating mode according to whether the zone in which the shared vehicle is operating is associated with at least one of air quality below a predetermined threshold and traffic congestion above a predetermined threshold.

17. The method of claim 15, further comprising providing the instruction to adjust the operating mode according to a speed of travel of vehicles in the zone.

18. The method of claim 11, further comprising determining that the shared vehicle has reached a drop-off point, and whether the shared vehicle is to be re-located after reaching the drop-off point.

19. The method of claim 18, further comprising recommending an operating mode for the vehicle for a relocation of the vehicle.

20. The method of claim 11, further comprising receiving the instruction via a network and adjusting the operating mode according to the instruction.

* * * * *